United States Patent [19]
Kinebuchi

[11] Patent Number: 5,802,244
[45] Date of Patent: *Sep. 1, 1998

[54] APPARATUS FOR SETTING A TIMER IN A VIDEO RECORDING DEVICE

[75] Inventor: Naoyuki Kinebuchi, Saitama, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 590,482

[22] Filed: Jan. 24, 1996

[30] Foreign Application Priority Data

Jan. 30, 1995 [JP] Japan .................................. 7-033128

[51] Int. Cl.$^6$ ...................................................... H04N 5/76
[52] U.S. Cl. ............................................................ 386/83
[58] Field of Search ...................................... 386/83, 65, 95; 348/906, 731; 455/186.1, 185.1; H04N 5/76

[56] References Cited

U.S. PATENT DOCUMENTS

| | | | |
|---|---|---|---|
| 5,500,741 | 3/1996 | Baik et al. | 386/93 |
| 5,526,127 | 6/1996 | Yonetani et al. | 348/906 |

FOREIGN PATENT DOCUMENTS

| | | |
|---|---|---|
| 424 725 | 5/1991 | European Pat. Off. . |
| 492298 | 7/1992 | European Pat. Off. . |
| 562 410 | 9/1993 | European Pat. Off. . |
| 607 814 | 7/1994 | European Pat. Off. . |
| WO 87 00380 A | 1/1987 | WIPO . |

*Primary Examiner*—Thai Tran
*Attorney, Agent, or Firm*—Frommer Lawrence & Haug LLP; William S. Frommer; Dennis M. Smid

[57] ABSTRACT

In a video tape recording device illustrated in the drawing, the microprocessor checks a label contained in either VPS or Teletext within a broadcasting signal of a channel specified in reference to the reservation data during waiting for a video recording in reservation mode and performs the video recording if the label is coincided with the reservation data. In the case that an instruction of time alignment of a timer is inputted, the channel transmitting the present time information in addition to the reservation channel is also tuned and the time of the timer is set by applying the present time information contained in the Teletext within the broadcasting signal. When the number of reserved programs is more than a predetermined number, the time information transmitting channel is not tuned even if the time alignment instruction is inputted, but only the specified channel is checked in reference to the reservation data. In this way, even if the video tape recorder waits for the video recording in reservation mode, the time alignment in the timer in the video tape recorder can be carried out by applying the present time information being transmitted in the broadcasting signal.

7 Claims, 7 Drawing Sheets

CNI : COUNTRY AND NETWORK IDENTIFICATION
PIL : PROGRAM IDENTIFICATION LABEL
PTY : PROGRAM TYPE (VPS)

FIG. 6 (RELATED ART)

[ PAGE - HEADER FORMAT ]

APPARATUS FOR SETTING A TIMER IN A VIDEO RECORDING DEVICE

BACKGROUND OF THE INVENTION

1. Field of the Invention

This invention relates to a video recording device constructed such that a user can reserve a desired program from some TV broadcasting programs and record the program automatically.

2. Description of Related Art

In the TV broadcasting network in Europe, a broadcasting service has been normally carried out in which a program is transmitted while a broadcasting start time of the program being on air at present is inserted into a vertical blanking period as an identification code (this program identification code is called as a label). Then, in the case that a program is recorded in its reservation mode in a video recording device such as a video tape recorder and the like, for example, there has been employed a system in which a user inputs data for specifying a channel of the program which the user wants to record, a broadcasting start time data as well as a broadcasting finish time data of the program as the reservation data into the video recording device and stores them in advance, thereafter the video recording device compares the label in the TV broadcasting signal being transmitted with the broadcasting start time data in the reservation data and executes the recording operation while they are coincided to each other (a system in which the video recording is performed under a reservation mode is defined herein as a label control system).

As a broadcasting system capable of enabling such a label control system to be carried out, various kinds of system are now being performed, a Video Programme System (hereinafter called as VPS) in which a transmittance is carried out with a label being inserted into a line 16 of a vertical blanking period is performed in Germany, Switzerland and Australia, for example, and a Programme Delivery Control (hereinafter called as PDC) in which a label is transmitted with a packet 8/30/format 2 of a Teletext is performed in the Netherlands and Belgium within the bounds of Dutch, respectively.

Teletext will be described briefly, wherein a transmittance of data in one magazine through Teletext is carried out with packets of 0 to 29. However, only magazine No. 8 contains up to 30 packets, this packet 8/30 also contains packet 8/30/format 1 in addition to the aforesaid packet 8/30/format 2 and then these packets are transmitted as service data packet of a broadcasting station under a predetermined period. In addition, a packet X/0 is defined as a Page-Header in the Teletext. Within the packet X/0 and the packet 8/30/format 1 is also contained information about the present time.

For a sake of reference only, a format of each of the signals of VPS, 8/30/format 2, 8/30/format 1 and the Page-Header is schematically indicated in FIGS. 3 to 6. As shown in these figures, the VPS signal contains label information at data of the 11-th byte to 13-th byte, and 8/30/format 2 contains label information at data of the 16-th byte to 21-th byte, respectively. In addition, 8/30/format 1 contains the present time information at data of the 15-th byte to the 21-th byte, and the Page-Header contains the present time information at data of the 38-th byte to the 45-th byte.

In addition to the video recording in reservation mode with the aforesaid label control system, in the case that a video recording is carried out in reservation mode for a program transmitted from a broadcasting station without any label, this video recording is performed as a video recording in reservation mode of a timer control system for performing a recording and a reproduction of the reservation program on the basis of a timer installed in the video recording device in accordance with the reservation data (channel data, broadcasting start time data and broadcasting finish time data) inputted by a user. In addition, it is also known in the art to apply a technical concept that when a broadcasting station can not transmit a label due to a certain trouble or the like even in the case that a program of the broadcasting station transmitted with the label is recorded in reservation mode, a video recording in reservation mode of a video recording device is automatically changed from the label control system to the timer control system in response to a desired control signal transmitted from the broadcasting station.

As described above, although controls based on the timer are carried out in the video recording device, it is naturally necessary that the timer indicates a correct time in order to cause these controls to be performed accurately. Due to this fact, when a power failure occurred or when a power supply plug of the video recording device was inserted into an outlet of a commercial power supply to start a new electrical supplying for the video recording device, it was necessary to set the time of a timer to a correct one every time the aforesaid state occurred. However, respective setting of time as described above was troublesome for a user.

In view of the foregoing, as a method for performing an automatic time setting, the time setting in the timer is performed automatically by applying the present time information transmitted in either the packet X/0 of Teletext (Page-Header) or the packet 8/30/format 1.

SUMMARY OF THE INVENTION

In the case that a time setting of the timer was carried out automatically as described above, the video recording device for performing a video recording in reservation mode in a label control system had to operate, under a state of waiting the video recording in reservation mode, an operation for tuning in sequence the reserved broadcasting stations in order to monitor the label to be transmitted, so that if there was no broadcasting station transmitting information indicative of the present time in the broadcasting stations being tuned in sequence, it was not possible to set a time.

In addition, as for the region where many broadcasting stations employ a PDC for a video recording of program in reservation, since it is recommended that the transmittance of label with the PDC is performed "before 30 seconds of starting of a program to 30 seconds before completion of the program", there may occur a case in which the reserved program cannot be recorded from the starting time of the program unless each of the reserved broadcasting stations is tuned once in at least 30 seconds. Accordingly, in the case that the broadcasting station transmitting information about the present time is also tuned in addition to tuning of many broadcasting stations for video recording in reservation mode for performing an automatic time setting, there may occur a possibility that the number of tuning broadcasting stations is increased, the reserved broadcasting station cannot be tuned within 30 seconds and a video recording from the starting time of program may not be carried out.

The present invention provides a video recording device comprised of a tuning means for tuning a broadcasting station for a reserved program in response to reservation data for use in reserving a video recording operation and then the video recording of the reserved program is executed on the basis of an output of comparison between the reserved data and a program identification data inserted into a TV broadcasting signal transmitted from the broadcasting station tuned by the tuning means, where its feature consists in the arrangement in which the tuning means tunes the broadcasting station for transmitting a TV broadcasting signal having information about the broadcasting station for the reserved program and the present time by every predetermined time during waiting for the video recording in reservation mode.

In view of the foregoing, it is preferable that the tuning device stops an operation for tuning the broadcasting station transmitting a TV broadcasting signal having information about the present time inserted therein when the number of programs of which video recording has been reserved is more than a predetermined number.

In addition, it is preferable that as the program identification data, data including the program starting time data is employed, and as information about the present time, data transmitted through the Teletext can be used.

In the case that a time setting instruction for the timer is set by a user, the broadcasting station transmitting information about the present time is automatically tuned even if the video recording device is in a state of within a video recording in reservation mode through either VPS or PDC.

In the case that the number of programs of which video recording is carried out in reservation mode is more than a predetermined value, an operation for tuning the broadcasting station transmitting information about the present time is not performed.

DESCRIPTION OF THE PREFERRED EMBODIMENTS

Figure 1:
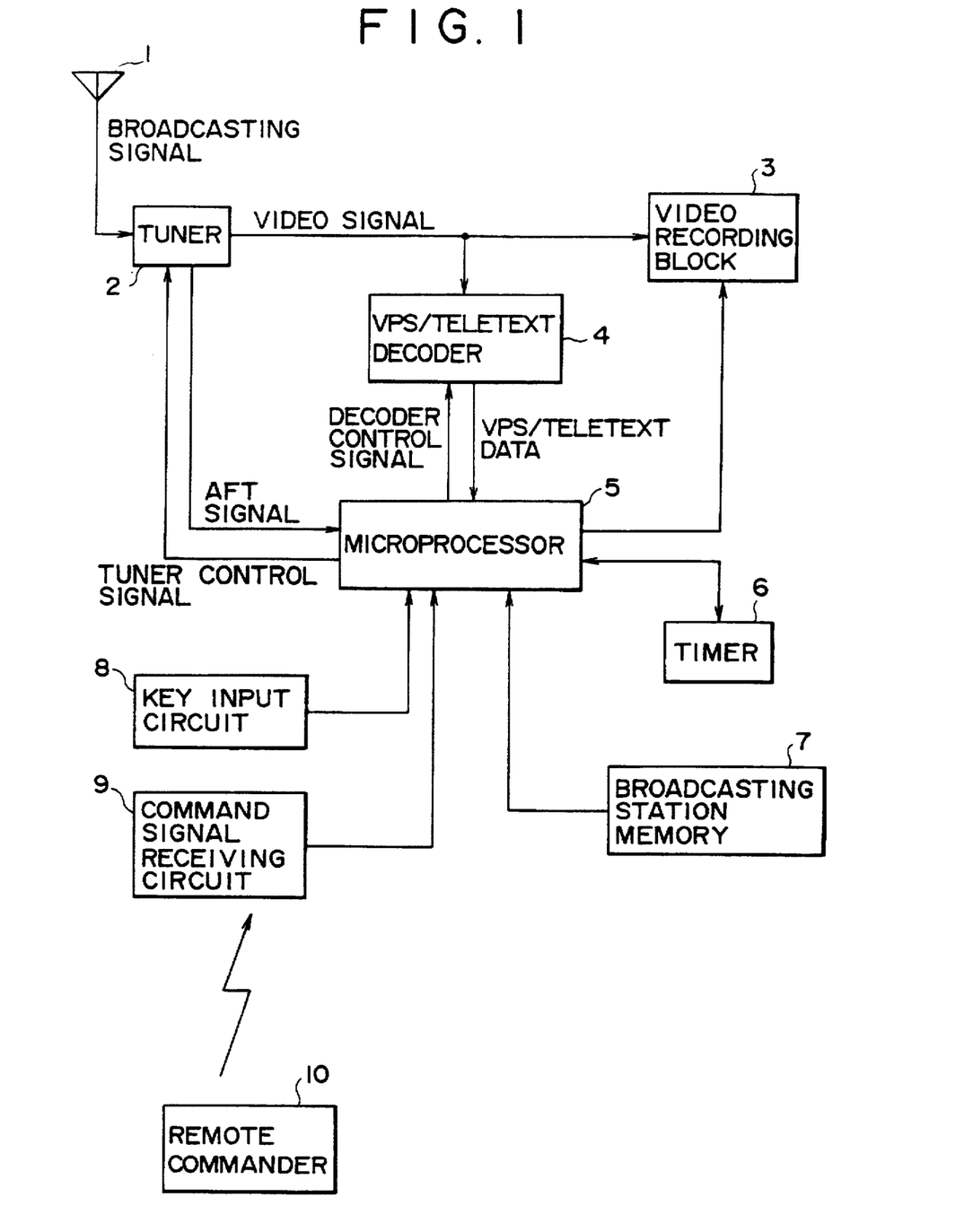
FIG. 1 is a block diagram of the video recording apparatus of the present invention.

In FIG. 1 is illustrated the preferred embodiment of the video recording device of the present invention. In this figure, a broadcasting signal received at an antenna 1 is supplied to a tuner 2 and concurrently during waiting of the video recording in reservation mode, a tuner control signal obtained from a microprocessor 5 is also supplied to the tuner 2. With such an operation as above, the channel of the reserved program is tuned and concurrently when an instruction for aligning time of the timer is being inputted by a user, the broadcasting station transmitting the present time information is also tuned. The signal obtained from the broadcasting station tuned by the tuner 2 is demodulated into a video signal there, and then the signal is inputted to a VPS/Teletext decoder 4 and a video recording block 3.

An input key circuit 8, a command signal receiving circuit 9 and a remote commander 10 in this figure are input means for use in giving the microprocessor 5, reservation data for recording video in reservation mode, an instruction to perform a time setting of a timer and other various instructions or input data. In addition, at the decoder 4, a label information of either VPS or PDC, and the present time information included in the packet 8/30/format 1 or packet X/0 in Teletext are taken out, and these information are inputted to the microprocessor 5. The microprocessor 5 compares a label information to be inputted with a broadcasting start time data within the reservation data, controls the video recording operation in the video recording block 3 on the basis of the result of comparison to perform a video recording in reservation mode and concurrently when an instruction for aligning time is being inputted by a user, the timer within the video recording device is set to the correct time in response to the present time information within the broadcasting signal.

As to the reservation data inputted to the video recording device, a time window in which the reservation data is effective is defined, the microprocessor 5 compares only the reservation data effective in the time window with the transmitted label so as to control a video recording operation. An example of this effective time window is indicated as follows:

Reservation for both a previous day and a present day is effective for a period ranging from 0:00 to 3:59, Reservation for a present day is effective for a period ranging from 4:00 to 19:59, and Reservation for a present day for a period ranging from 20:00 to 23:59 and a reservation up to 4:00 of a next day.

In addition, in this preferred embodiment, the case in which the circuit is constructed to enable maximum 8 programs to be recorded in reservation mode will be described as an example. In this case, since it is necessary that the reserved broadcasting station within the effective time window must be tuned at least once per 30 seconds and its label must be checked in order to cause the video recording to be performed accurately in reservation mode through PDC as described above, a tuning time for one broadcasting station becomes 30/8 (=3.75) second in order to tune all the maximum 8 broadcasting stations in 30 seconds.

Although it is applicable that the tuning time can be set shorter than the above value, it is desirable to set it as long as possible in view of a time required up to a stabled tuning operation of the tuner 2, a time required up to a locking of PLL of the decoder 4 and a transmitting period of PDC and the like, and so the case in which the tuning time per one broadcasting station in the preferred embodiment is set to 3.75 second will be described. In addition, in the preferred embodiment, numbers ranging from "1" to the maximum number of "8" are set for each of the program reservations to enable each of the program reservations to be identified and these numbers are called as a reservation number.

In addition, in the preferred embodiment, there is provided within the microprocessor a tuning reference value storing register for use in storing a tuning reference value which is revised in sequence, and the broadcasting stations having each of the reservation numbers are tuned in sequence in response to the tuning reference value. When the microprocessor is energized, a default value "0" is stored in the tuning reference value storing register. In addition, the video recording device of the preferred embodiment is constructed such that the broadcasting station transmitting information about the correct present time in a region where this device is operated is stored in advance in the broadcasting station memory 7 within the device and when an instruction is being inputted by a user to align the time in the timer, this broadcasting station is also being tuned.

Then, a controlling operation for a video recording in a reservation mode and a time setting by the microprocessor 5 of the preferred embodiment will be described as follows. The microprocessor 5 performs these controlling operations by executing the control program stored in it. However, the microprocessor performs an operation flow shown in FIG. 2 stored in the control program in particular so as to perform the tuning operation for the video recording in reservation mode and the time setting operation.

Figures 2, 2B:
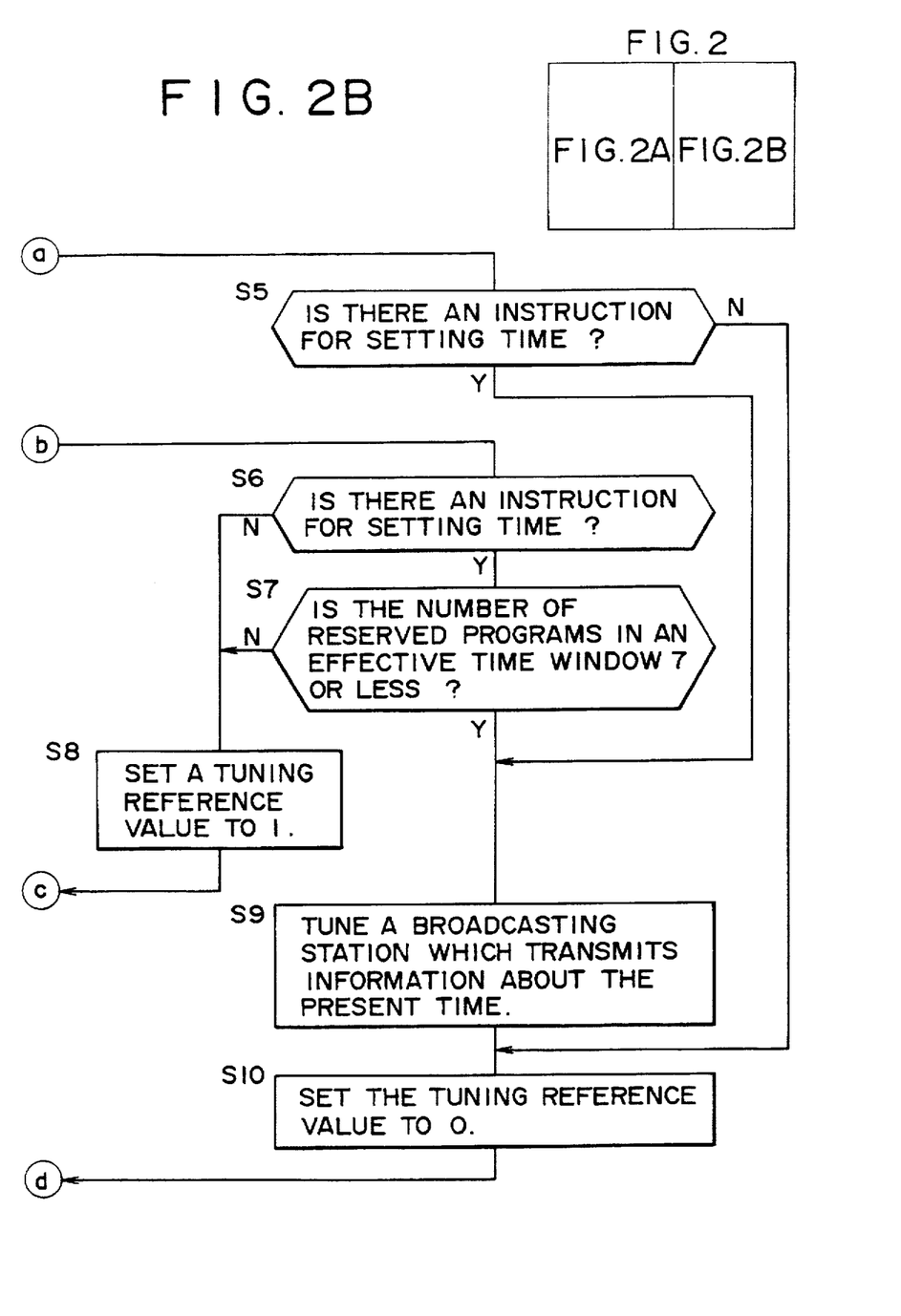
FIG. 2 is a flow chart of the tuning operation performed in the microprocessor shown in FIG. 1.
Figure 2A:
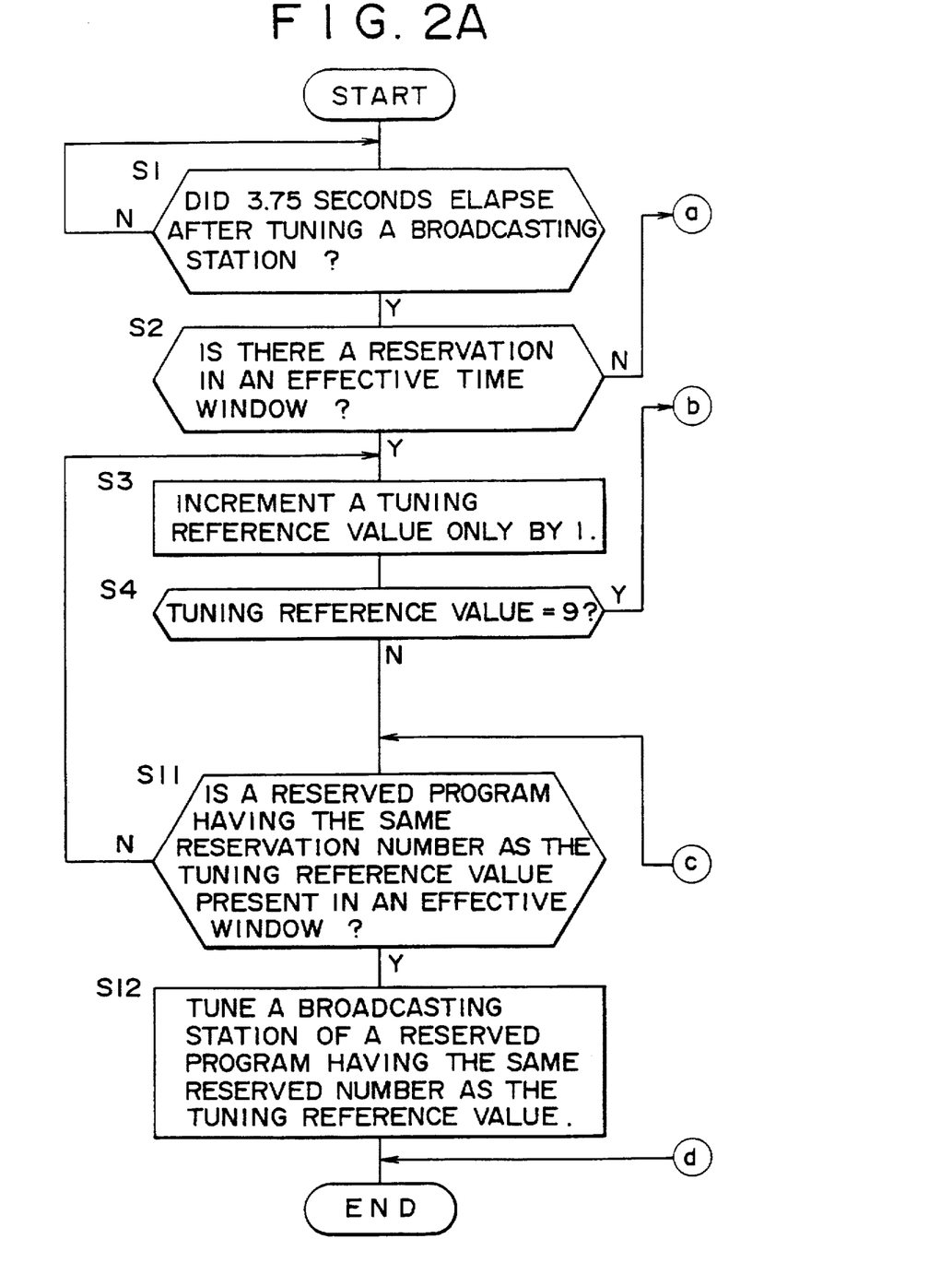
Figure 3:
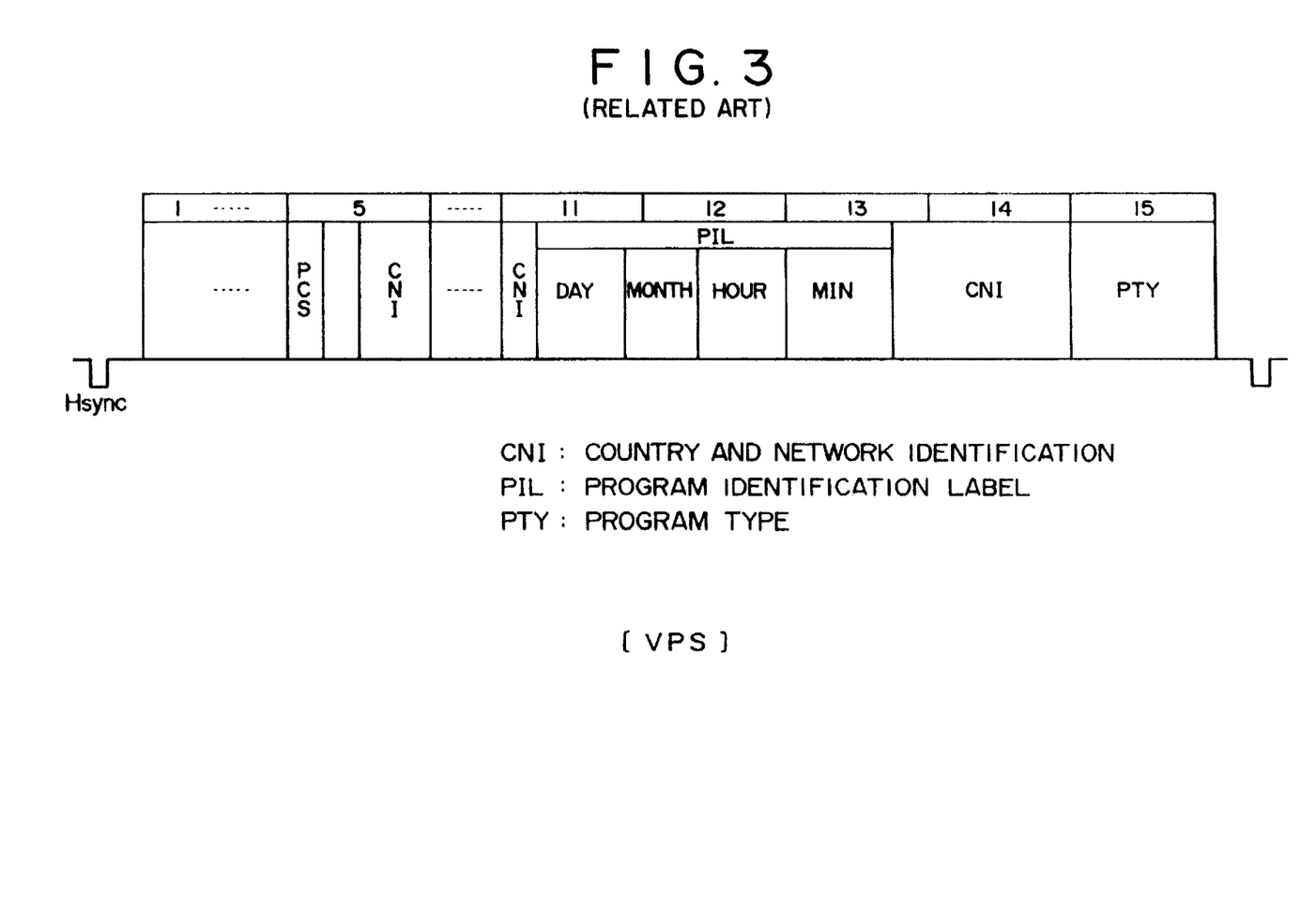
FIGS. 3, 4, 5, 6 are formats of the VPS signal, 8/30/format 2, 8/30/format 1 and Page-Header respectively.
Figure 4:
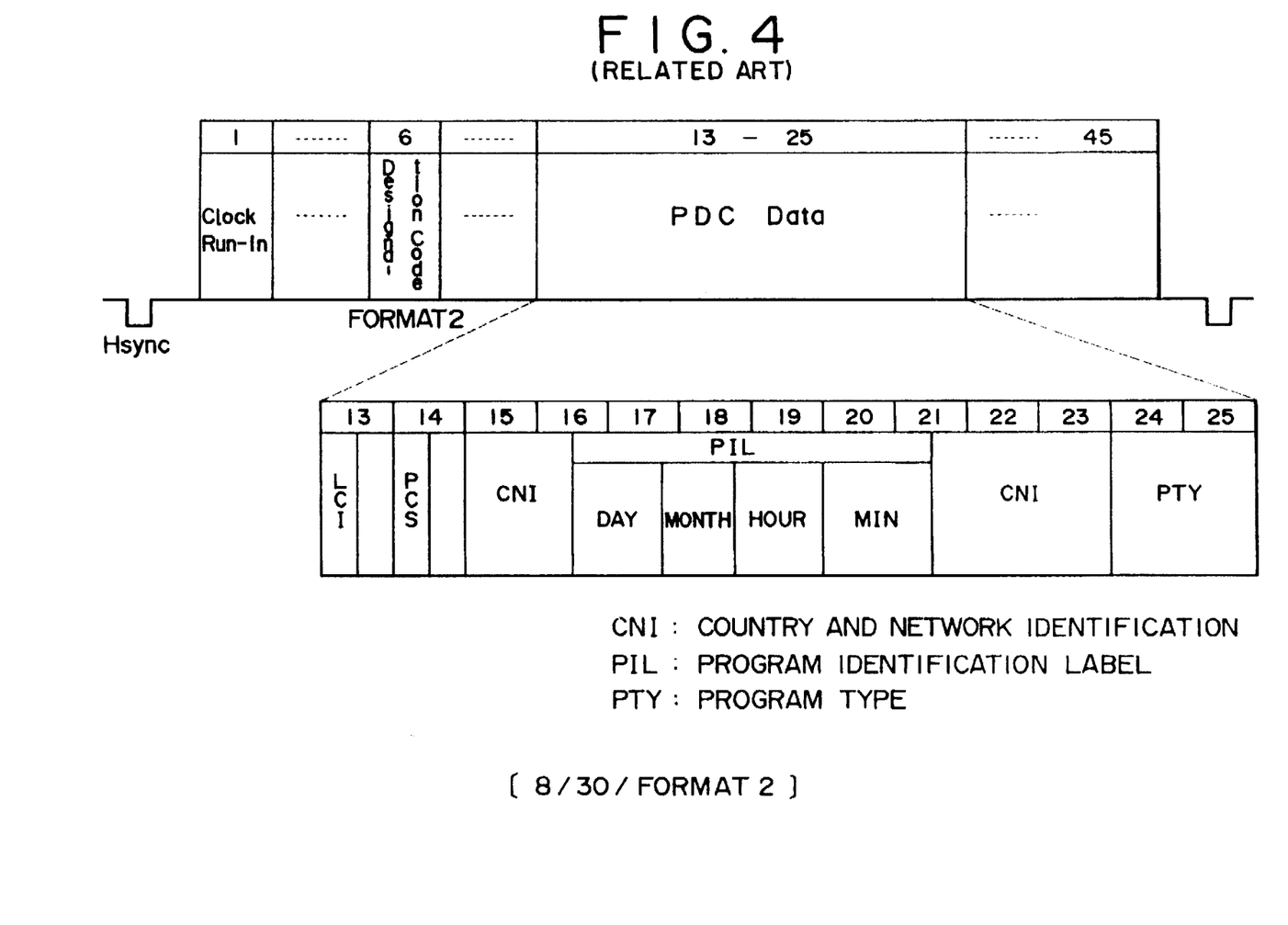
Figure 5:
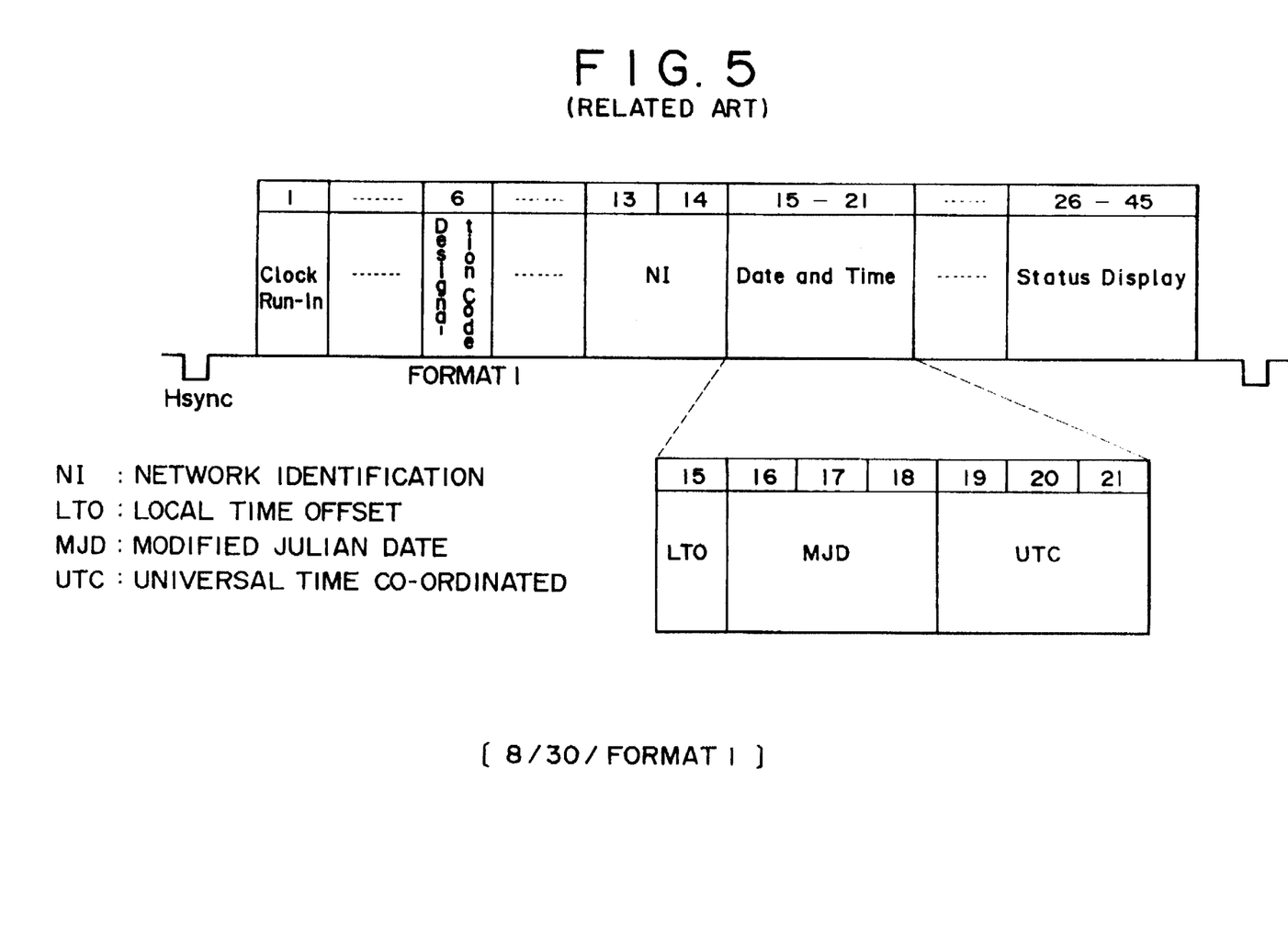
Figure 6:
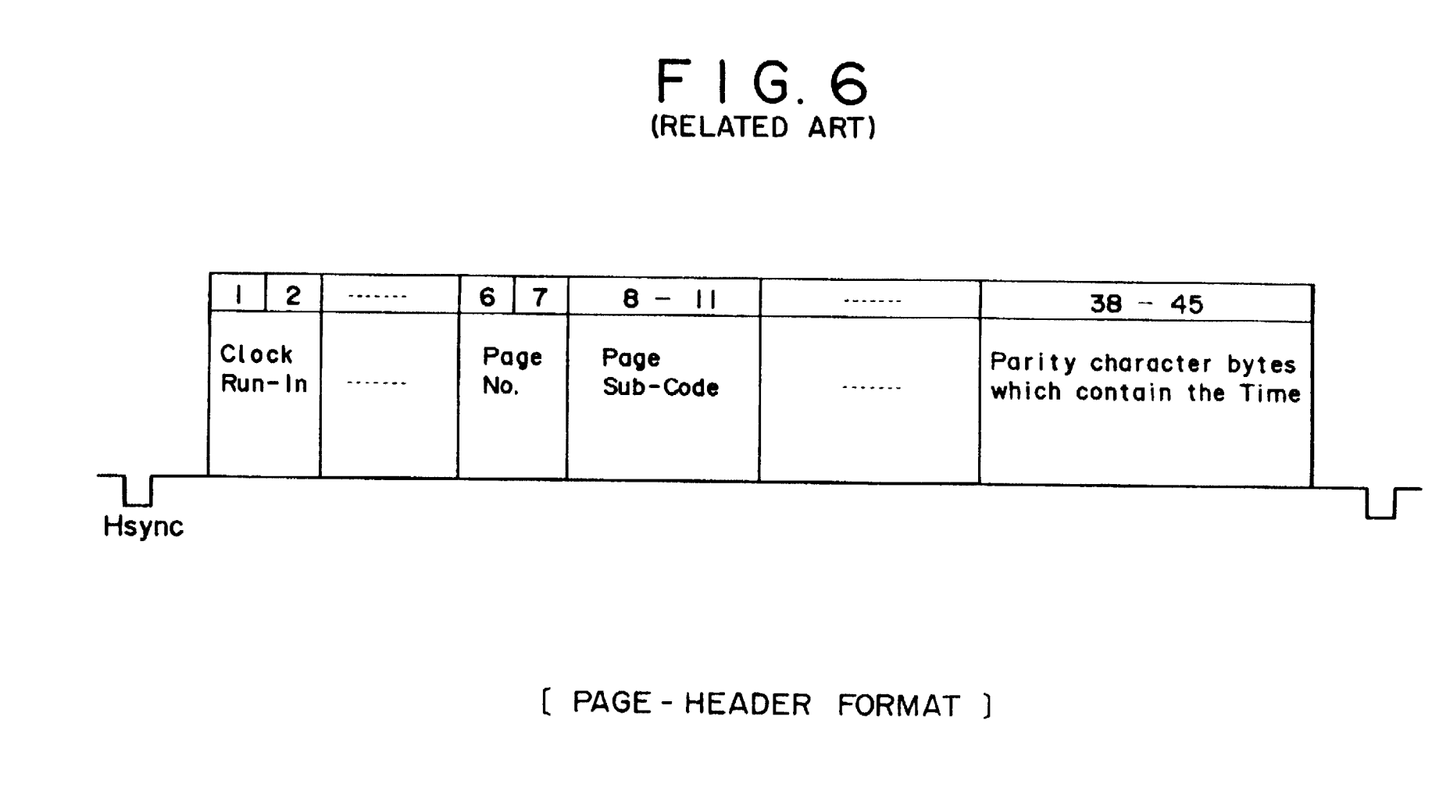

The tuning operation in reference to this flow shown in FIG. 2 will be described as follows, wherein at first, at a step S1, it is confirmed that a time elapses by 3.75 seconds after tuning, and then the operation is transferred to the next step. With such an arrangement as above, every 3.75 seconds, the microprocessor performs the flow of tuning for the video recording in reservation mode and the time aligning operation comprised of the following steps S2 to S12 during waiting of the video recording in reservation mode, respectively.

At the next step S2, it is checked whether or not a reservation is found in the present effective time window, and if there is no reservation, it is checked whether or not the instruction for aligning time of the timer is inputted by a user (a step S5). Then, when this instruction is being inputted, the broadcasting station transmitting information about the present time is tuned at a step S9, thereafter the content in the tuning reference value storing register is set to "0" (a step S10). When no instruction is inputted, the step S10 is immediately executed. After running the step S10, the operation is transferred to the control program subsequent to the flow shown in FIG. 2.

When the result of judgment at the step S2 is YES, the content of the tuning reference value storing register is incremented only by "1" and a step S11 is performed through the judgment process of the step S4. Then, a loop comprised of the step S3, the step S4 and the step S11 is executed, the reservation program in the effective time window of each of the reservation programs with the reservation numbers "1" to "8" is detected in sequence from a lower reservation number and the broadcasting station of the detected reservation program is tuned at the step S12.

When the detecting operation for each of the reservation programs corresponding to the tuning reference values "1" to "8" through a repetitive operation of the aforesaid loop is executed in sequence to cause the tuning reference value to become "9", the operation is transferred from the step S4 to the step S6 so as to check if an instruction of time alignment is inputted by a user. When no instruction is inputted, the tuning reference value is returned to "1" and the operation is transferred to the step S11 and the sensing operation for the reserved program within the effective time window is started again. When a result of judgment at the step S6 is YES, it is checked whether or not the number of reserved programs in the effective time window is less than 7. If the number is 7 or less, the operation is transferred to the step S9, and then a tuning for a time alignment is executed. In the case that the number of reserved programs is larger than 7, i.e. the number is 8, the operation is transferred to the step S11 through the step S8 without performing any tuning for the time alignment and then the operation for sensing the reserved program in the effective time window is started again.

As apparent from the description about the aforesaid operation, if the number of reserved programs within the effective time window is 7 or less even in the case that the video recording in reservation mode is being waited in the preferred embodiment, the tuning of the broadcasting station transmitting the correct present time information is also carried out when the instruction for time alignment is inputted from a user, and the time alignment is carried out automatically. Then, in the case that the number of reserved programs within the effective time window is 8 in maximum which can be reserved, no tuning operation for the time alignment is carried out even if the instruction of time alignment is inputted, and then the operation for tuning each of the broadcasting stations for 8 reserved programs is performed.

Although the preferred embodiments of the video recording device of the present invention have been described above, it is of course apparent that the present invention is not limited to such preferred embodiments as above and various modifications in configuration of the present invention can be carried out within the scope of the technical concept of the present invention. Examples of such modifications in configuration as described above will be described as follows, wherein in the aforesaid preferred embodiments, although a program identification code is inserted into the vertical blanking period of the broadcasting signal and transmitted, this code may be inserted into the horizontal blanking period of the broadcasting signal and transmitted. In addition, a format of the TV broadcasting signal is not limited to the analog signal, but it may be a broadcasting signal in which the TV signal is changed into a digital form and transmitted. In this case, in addition to the video data as well as voice data changed into digital forms, it is satisfactory if the aforesaid program identification code is transmitted as a secondary data.

In addition, the practical data content of the program identification data is not necessarily limited to the program broadcasting start time data as disclosed in the preferred embodiment and in brief it is satisfactory that the data is one capable of specifying the reservation program. Then, as to information about the present time inserted into the broadcasting signal, there may be employed some information transmitted in various forms in addition to the forms transmitted by Page-Header of Teletext or 8/30/format 1 as disclosed in the preferred embodiment.

Even in the case of waiting for a video recording in reservation mode, it is possible to align a time of the timer automatically in response to the present time information within the broadcasting signal. In addition, in the case that a product of the number of reserved programs within the effective time window and a tuning time for one reservation is 30 seconds or more, the tuning operation for the time alignment is not carried out to cause the video recording in reservation mode for all the reserved programs within the effective time window to be performed.

What is claimed is:

1. A video recording device comprised of a timer and tuning means for tuning a broadcasting station for a reserved program in response to reservation data for use in reserving a video recording operation and then the video recording of the reserved program is executed on the basis of an output of comparison between said reserved data and a program identification data inserted into a TV broadcasting signal transmitted from the broadcasting station tuned by the tuning means, an improvement in which said tuning means tunes the broadcasting station for transmitting a TV broadcasting signal having information about the broadcasting station for the reserved program and a present time while waiting for the video recording in reservation mode and in which the timer is set to a present time in accordance with the present time information from the TV broadcasting signal, in which the tuning means automatically stops an operation for tuning the broadcasting station transmitting a TV broadcasting signal having information about the present time inserted therein when the number of programs of which video recording has been reserved is more than a predetermined number.

2. A video recording device as set forth in claim 1 in which the program identification data includes a program broadcasting start time data.

3. A video recording device as set forth in claim 1 in which information about the present time is data transmitted through Teletext.

4. A video recording device as set forth in claim 3 in which information about the present time is data transmitted through Teletext.

5. An apparatus for recording a broadcasted signal or signals representative of a number of programs, said apparatus comprising:

means for receiving a number of said broadcasted signals, in which at least one broadcasted signal includes information indicative of a current time;

means including a timer device for selecting a number of programs to be recorded;

means for determining whether the number of selected programs to be recorded exceeds a predetermined number; and means for automatically setting a current time in said timer device in accordance with the current time information from the broadcasted signal when the number of selected programs does not exceed said predetermined number and for not setting a current time in said timer device in accordance with the current time information from the broadcasted signal when the number of selected programs exceeds said predetermined number.

6. An apparatus for recording a broadcasted signal or signals according to claim 5, further comprising memory means for storing information indicative of a broadcast station which transmitted the broadcast signal having the current time information.

7. An apparatus for recording a broadcasted signal or signals according to claim 5, further comprising means for generating a time setting signal in response to a user command and wherein the setting means automatically sets the current time in said timer device in response to said time setting signal when the number of selected programs does not exceed said predetermined number and does not set the current time in said timer device in response to said time setting signal when the number of selected programs exceeds said predetermined number.

* * * * *